Patented July 7, 1925.

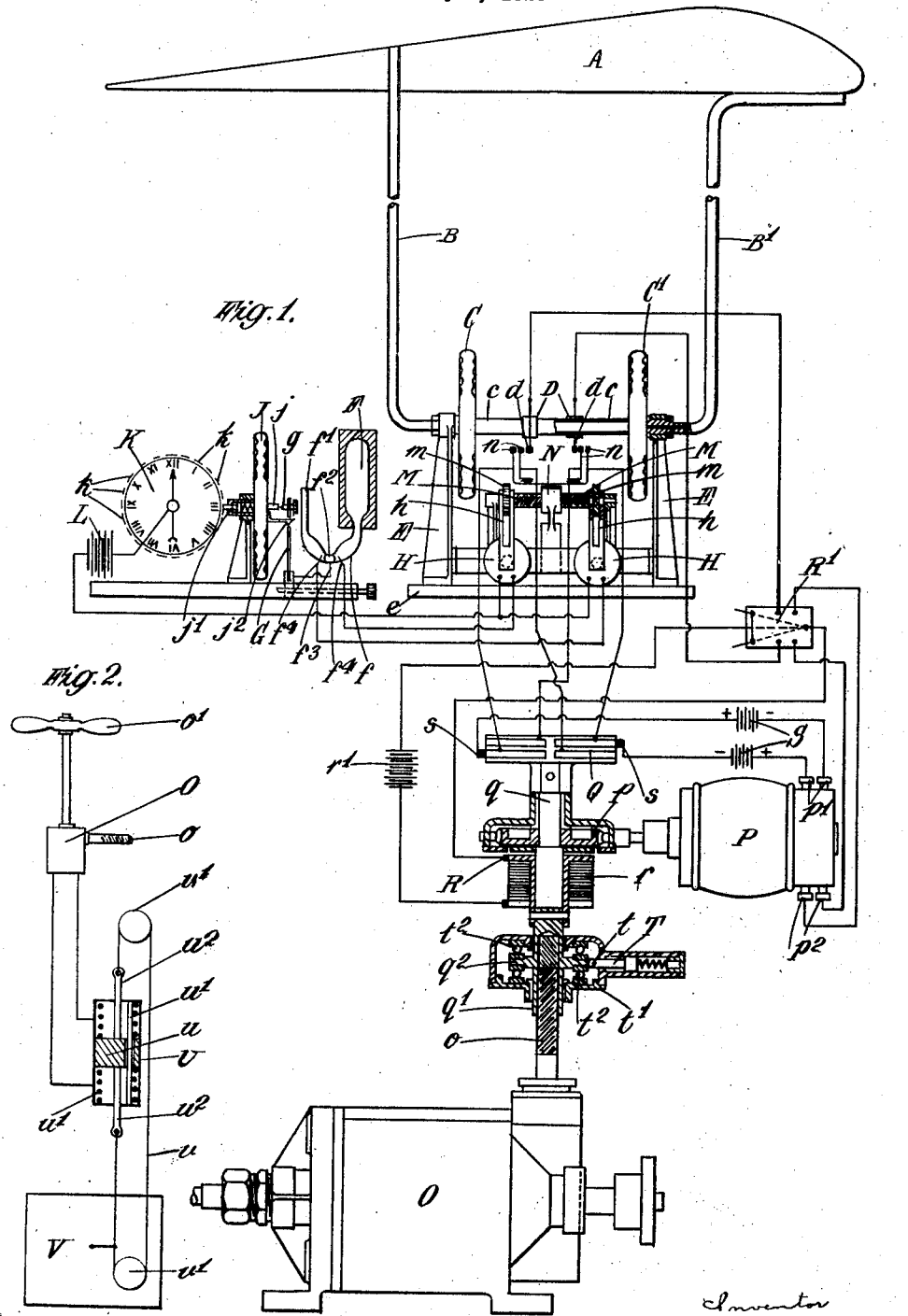

1,545,373

UNITED STATES PATENT OFFICE.

OLIVER HENRY DOUGLAS VICKERS, OF WESTMINSTER, LONDON, ENGLAND, ASSIGNOR TO VICKERS LIMITED, OF WESTMINSTER, LONDON, ENGLAND.

FORE-AND-AFT CONTROL OF AIRCRAFT.

Application filed May 8, 1923. Serial No. 637,425.

*To all whom it may concern:*

Be it known that I, OLIVER HENRY DOUGLAS VICKERS, a subject of the King of Great Britain, residing at Vickers House, Broadway, Westminster, in the county of London, England, have invented certain new and useful Improvements in or Relating to the Fore-and-Aft Controls of Aircraft, of which the following is a specification.

This invention relates to the fore and aft control of aircraft and provides an improved automatic device by which variation in height is corrected, so that when the instrument is set the aircraft will maintain, within a comparatively small margin of error, a constant level.

According to this invention the fore and aft control mechanism of the aircraft is operated through a motor the movement of which is directed electrically by the aid of a statoscope comprising a closed air chamber subjected to atmospheric pressure through a movable septum, such as a mercury globule, the movement of which effects the making or breaking of an electrical controlling circuit. As the mercury globule closes the opening of the air chamber to the atmosphere any alteration in pressure of the atmosphere will cause a displacement of the globule to one side or the other in the well known manner, and this effect is utilized as an automatic stabilizing control, so that when the aircraft is rising or falling the automatic control device is put into operation to correct the upward or downward deviation.

The statoscope is preferably arranged to operate intermittently through a clock or clockwork device which at regular intervals completes the statoscope circuit, whereby a correcting operation is applied to the control mechanism if any substantial change in level is occurring. Contact may be made through an aneroid box, a contact arm electrically connected to the central contact of the statoscope carrying an adjustable contact screw adapted to meet a contact stud on one face of the aneroid box, a spring-pressed brush for the clock contacts being carried at the other side of the box. The box also carries a small catch which engages the contact arm and holds it in circuit-closing position, the catch releasing the contact when the circuit is to be broken and the automatic control cut off. By setting the contact screw the statoscope control apparatus may be brought into operation at any desired height, the circuit being completed at the aneroid box only when the external pressure has fallen to a predetermined level.

The statoscope and clock may be used in conjunction with air pressure controlled apparatus comprising tubes leading from the upper and lower sides of the wing or aerofoil giving negative and positive pressures varying with the angle of incidence. The statoscope circuit effects the setting of the fore and aft controlling mechanism through an adjustable contact device in the differential air pressure operated system, by means of a quick pitch screw on which the contact device is mounted, the quick pitch screw being turned in either direction according to the direction of the contact made by the statoscope, so displacing, at each statoscope operation, the controlling contacts in a direction which corrects for the rising or falling movement of the aircraft.

The operation of the fore and aft control mechanism may be effected through variable speed gear mechanism of the Williams-Janney type comprising pump and motor units in which the pump delivery is variable.

In order that the said invention may be clearly understood and readily carried into effect, the same will now be described more fully with reference to the accompanying drawings, in which:—

Figure 1 is a diagrammatic view of a control system embodying this invention; and Figure 2 indicates diagrammatically the connections to the usual control surfaces of the aircraft.

A is the aeroplane wing or aerofoil shown in outline. B, B$^1$ are air tubes opening respectively through the upper surface of the wing, considerably behind the leading edge, and forwardly immediately below the leading edge, so that during the flight of the aeroplane the air in the two tubes is subjected respectively to variable suction and variable positive pressure. C, C$^1$ are air boxes of the type used in aneroid barometers, open respectively to the two air tubes and connected together by the adjustable tubular connection $c$, carrying an adjustable contact making device D comprising in the arrangement shown four contacts. The air boxes are mounted on the brackets E carried on the base $e$.

F is the statoscope air chamber terminating in the U-tube $f$, the end $f^1$ of which is open to the atmosphere. A mercury globule $f^2$ lies in the lowest part of the tube $f$ which, as shown, is contracted at the part receiving the globule so that it swells out on either side. Circuit contacts $f^3$, $f^4$ lead into the tube respectively at the centre and at a little distance from each end of the mercury globule so that a small displacement of the globule will make contact on either side. The contact $f^3$ is connected up to the spring contact arm G having an adjustable contact piece $g$ at the end, while the side contacts $f^4$ are connected up to the two electro-magnets H on the base $e$. J is an air box of aneroid type with contact $j$ adapted to meet the contact $g$ and a spring pressed brush $j^1$ maintained by the spring against the edge of the clock disc K, the clock disc having a number of small contact strips $k$ placed at suitable intervals around its periphery. L is a battery connected up to the clock and to the electro-magnets H.

M is a quick pitch screw carrying the contact device N, which comprises two pairs of side contacts $n$ adapted to make contact respectively with one or other of the contact pieces $d$ of the adjustable contact device D.

To make the electrical statoscope control effective when the aircraft reaches the desired height, the box J is set so as to move the contact $j$ against the contact $g$ of the arm G when the external pressure falls to a predetermined amount, the arm being then retained in contact position by the small catch $j^2$ on the box J. The clock K moves continuously at a predetermined speed and at regular intervals brings one of its contact strips against the brush $j^1$, the statoscope control being, therefore, operative intermittently at intervals controlled by the clock. If the aircraft is flying at constant level the pressure in the statoscope chamber F is equal to the external pressure and the mercury globule $f^2$ will, therefore, remain in its central position out of contact with both of the contacts $f^4$ so that the circuit through the electro-magnets H is not completed. If, however, any change of level occurs the air in the chamber expands or contracts and the mercury globule $f^2$ is consequently moved over to one side or the other and closes the circuit through the battery L and one of the electro-magnets H. The electro-magnets H when excited turn the quick pitch screw M one step in one direction or the other through armatures $h$ and the small ratchet wheels $m$ on the screw, the armatures carrying pawls at their upper end engaging the ratchet wheels $m$, so that at each excitation of one of the magnets the armature operates the quick pitch screw to displace the contact device N in the desired direction relatively to the contact device D. Each statoscope operation effects only a small displacement which alters the neutral position of the contacts but contact at D, N is actually made only when the device D is sufficiently displaced by the air boxes C, $C^1$. If at the next contact of the clock the aircraft is still rising or falling a fresh movement is given to the screw M giving further displacement to the neutral position of the device N and unless correcting operations have taken place additional displacements will occur until the fore and aft control is brought into action to restore the aircraft to its proper level. Movement of level in the other direction will reverse the displacement of the contact device N. When contacts $d$ and $n$ meet the control circuit is closed, bringing about the operation of the fore and aft control mechanism as hereinafter described.

The fore and aft control mechanism is of the usual type and is indicated in Figure 2. The apparatus employed to operate it may be variable speed hydraulic mechanism of the Williams-Janney type, of which the continuously driven variable delivery pump is shown at O, the pump being connected to a suitable motor unit, such, for example, as a double acting ram, for actuation of the usual controls. The pump O has its delivery varied in the ordinary manner from zero to maximum through the control shaft $o$ which has a quick pitch thread. Hunting gear of known type may be associated with the motor unit.

As indicated diagrammatically in Figure 2, the pump O, which may be continuously driven by an air propeller $o^t$ is connected to the ram U at opposite ends, the ram piston $u$ providing a small leakage from one side to the other and acting against springs $u^1$ which allow a displacement on either side varying with the delivery rate of the pump O. The piston rods $u^2$ are connected to the usual control surface V of the aircraft through the flexible connection $v$ passing over pulleys $v^1$ so that the surface V is displaced in either direction according to the pump adjustment.

To vary the delivery from the continuously driven pump O in either direction a small reversible electric motor P is provided in the statoscope and differential air pressure controlled circuit, the motor driving the worm gear $p$ loose on a spindle $q$ carrying a follow-up contact device Q having a number of segments connected up to the adjustable contact device N. A downwardly extending sleeve $q^1$ on the spindle $q$ is formed with an internal quick pitch thread screwing on the shaft $o$. Between the worm wheel $p$ and the shaft $q$ a magnetic clutch R is interposed so that the shaft $q$ is clutched to and declutched from the worm wheel $p$ automatically.

The terminals $p^1$ of the reversible motor

P are connected up to the batteries S, which may represent the two sides of a divided battery, the current driving the motor in either direction according to the connections. The circuits from the batteries and the terminals $p^1$ pass through the brushes $s$ on the segmental contact device Q. The segments of the device Q are connected up in pairs as shown to the contacts $n$ of the contact maker N. The terminals $p^2$ of the motor P are connected up, respectively, to the two contacts $d$ of the contact device D operated by the air boxes C, $C^1$, the circuit including a clutch relay $R^1$ with battery $r^1$ and the magnet $r$ of the magnetic clutch R is excited when the relay $R^1$ is operated.

If the statoscope F operates in one direction or the other when one of the clock contacts $k$ is under the brush $f^1$ one or other of the electro-magnets H is excited and the quick pitch screw M is turned in the corresponding direction through the pawl and ratchet device. If the contact device N is central a movement in either direction brings the contacts $n$ and $d$ at one side towards each other. If the contact device D is displaced sufficiently by the air boxes C, $C^1$ the motor circuit is closed at $d$, $n$, the relay $R^1$ excites the magnet $r$ and the control shaft $o$ of the pump O is brought into operative connection with the motor driven worm wheel $p$. The motor circuit is completed through a battery S, a brush $s$ and the segmental contact device Q and the motor rotates in the required direction to operate the variable speed pump control. The control shaft $o$ moves the swash plate of the pump O in the case of a Williams-Janney type of pump and according to the movement of the shaft $o$ the rate of delivery of the pump is regulated and consequently the extent of movement of the motor unit actuating the fore and aft control mechanism of the aeroplane. The direction of the pump delivery and therefore that of the motor movement depends on whether the shaft $o$ moves up or down and the operation is such as to cause the air craft to rise or fall according to the direction in which electrical contact has been made at D, N. The speed reduction between the motor P and the shaft $o$ is considerable, as the operation is effected through the worm gear $p$ and through the internally screwed sleeve $q^1$ belonging to the magnetic clutch, which sleeve screws the shaft $o$ up or down as required. The operation continues until the follow-up contact device Q has turned sufficiently to move the segment connected to the contact $n$ from under the brush $s$ which has been in the motor circuit, whereupon the motor stops and the magnetic clutch opens. The follow-up contact device Q is shown as provided with two pairs of segments to the two pairs of contacts $n$, these contacts being closed successively if the differential air pressure at the boxes C, $C^1$ increases, so that for large changes the motor P is allowed to turn through a larger number of revolutions before the normal condition is restored. The contact device Q is returned to its normal position by the action of the pump control as there is always a reaction on the swash plate or other controlling device which tends to return it to its neutral position. As soon therefore as the magnetic clutch opens and frees the device from the worm gear the back pressure in the pump moves the shaft $o$, which by the action of the quick pitch thread turns the sleeve $q^1$, spindle $q$ and contact device Q till the neutral position is reached, ready for the next operation. To ensure proper centering of the device at neutral position the sleeve $q^1$ may carry a ring $q^2$ having a notch at a suitable point receiving the ball $t$ of the spring pressed plunger T, the centering device being enclosed within the casing $t^1$ provided with top and bottom thrust bearings $t^2$ for the ring $q^2$.

For rising or descending the statoscope F is cut out by breaking the circuit at the contacts $g$, $j$, when the difference in pressure arising between the atmosphere and the interior of the statoscope moves the mercury into one or or other of the enlarged portions of the U-tube at either side of the contacts, allowing communication to be established between the statoscope chamber and the external atmosphere, so that equality of pressure is attained when the control is re-established. The statoscope at any time, in the event of the aircraft changing its height substantially, will re-establish equality of pressure should the difference between external and internal pressure become sufficient to displace the mercury into an enlarged portion of the tube, the statoscope functioning to restrain downward or upward movement at any time rather than to keep a settled height.

What I claim and desire to secure by Letters Patent of the United States is:—

1. In fore and aft control apparatus for aircraft, a reversible electric motor, a motor operating circuit provided with reversible contact mechanism, a statoscope comprising a closed air chamber having a sealing mercury globule and subjected to atmospheric pressure through the mercury globule and an electrical circuit have statoscope contacts at the mercury globule and to either side, so that the circuit is closed by the movement of the globule on change in pressure.

2. In fore and aft control apparatus for aircraft, a controlling electric motor, a motor operating circuit provided with contact mechanism, a statoscope comprising a closed air chamber containing gaseous fluid at atmospheric pressure and provided with a movable septum separating the said air chamber from the atmosphere, the movement of which septum effects the operation of the said contact mechanism, and timing mechanism which renders the statoscope control operative only at predetermined intervals.

3. In fore and aft control apparatus for aircraft, a controlling electric motor, a motor operating circuit provided with contact mechanism, a statoscope comprising a closed air chamber containing gaseous fluid at atmospheric pressure and provided with a movable septum separating the said air chamber from the atmosphere, the movement of which septum effects the operation of the said contact mechanism, and clockwork mechanism carrying a series of contacts adapted to complete intermittently the statoscope control circuit.

4. In fore and aft control apparatus for aircraft, a reversible electric motor, a servo motor regulated by the said electric motor and affecting the operation of the aircraft control surfaces, a contact making device for the electrical motor circuit and a statoscope adjusting the position of the said contact making device.

5. In aircraft control apparatus as claimed in claim 4, a follow-up contact mechanism adapted to cut out the electric motor on the completion of a predetermined movement and to return automatically to neutral position.

6. In operating means for aircraft, an aerofoil, a pair of air channels opening to the atmosphere respectively through the upper side of the aerofoil substantially behind the leading edge and forwardly below the leading edge so as to be subjected respectively to negative and positive air pressures during flight, a pair of air boxes having resilient walls facing each other and each connected to one of the said air channels and a rigid connecting member between the two opposing box faces.

7. In operating means for aircraft as in claim 6, an electrical contact device carried by the said connecting member and electrical aircraft control mechanism operated by the said contact device.

8. In aircraft control apparatus as claimed in claim 4, an aerofoil and means, under the control of the angle of incidence of the aerofoil, which effect in association with the statoscope the operation of the said contact making device.

9. In aircraft control apparatus as claimed in claim 4, an aerofoil, an air tube system carried by the aerofoil and opening to the atmosphere so that variations of pressure are produced in the system according to variations in the angle of incidence during flight, and connections from the air tube system to the said contact making device adjusted by the statoscope, whereby contact is made in either direction by variations of pressure from the normal in the air tube system.

10. In fore and aft control apparatus for aircraft, a controlling electric motor, a motor operating circuit provided with contact mechanism, a statoscope comprising a closed air chamber containing gaseous fluid at atmospheric pressure and provided with a movable septum separating the said air chamber from the atmosphere, the movement of which septum effects the operation of the said contact mechanism, and means for setting the statoscope control system in operation on reaching a predetermined height, comprising a closed air box and a contact device in the statoscope circuit operated by the air box, whereby contact is made when the external pressure has fallen to a predetermined level.

11. In fore and aft control apparatus for aircraft, a controlling electric motor, a motor operating circuit provided with contact mechanism, a statoscope comprising a closed air chamber containing gaseous fluid at atmospheric pressure and provided with a movable septum separating the said air chamber from the atmosphere, the movement of which septum effects the operation of the said contact mechanism, and means for setting the statoscope control system in operation on reaching a predetermined height, comprising a closed air box, a contact device in the statoscope circuit operated by the air box, whereby contact is made when the external pressure has fallen to a predetermined level, and a catch associated with the air box which maintains the circuit making position when contact has been made.

12. In fore and aft control apparatus for aircraft, a controlling electric motor, a motor operating circuit provided with contact mechanism, a statoscope comprising a closed air chamber containing gaseous fluid at atmospheric pressure and provided with a movable septum separating the said air chamber from the atmosphere, the movement of which septum effects the operation of the said contact mechanism, and a servo motor actuating the fore and aft control surface of the aircraft, which servo motor comprises a variable delivery hydraulic pump and a motor unit connected to the said pump, delivery control mechanism for the said pump, reducing gear between the controlling electric motor and the delivery control mechanism and a follow-up electrical contact device associated with the said gear and adapted to break the controlling electric motor circuit after a predetermined movement and to return to neutral position by the reaction of the variable delivery pump.

13. In fore and aft control apparatus for aircraft, a controlling electric motor, a motor operating circuit provided with contact mechanism, a statoscope comprising a closed air chamber containing gaseous fluid at atmospheric pressure and provided with a movable septum separating the said air chamber from the atmosphere, the movement of which septum effects the operation of the said contact mechanism, and a servo motor actuating the fore and aft control surface of the aircraft, reducing gear between the controlling electric motor and the said servo motor, an electro-magnetic clutch in the said gear under the control of the motor circuit, and contact mechanism adapted to close and open the clutch on making and breaking of the motor circuit.

OLIVER HENRY DOUGLAS VICKERS.